Jan. 8, 1924.  
L. E. MITCHELL  
PROTECTING DEVICE FOR MACHINES  
Filed Oct. 6, 1921  
1,479,922
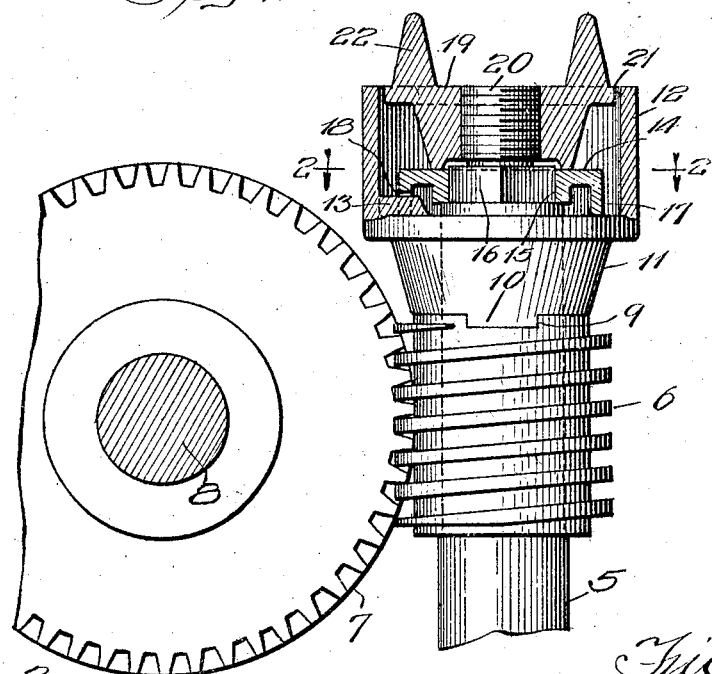
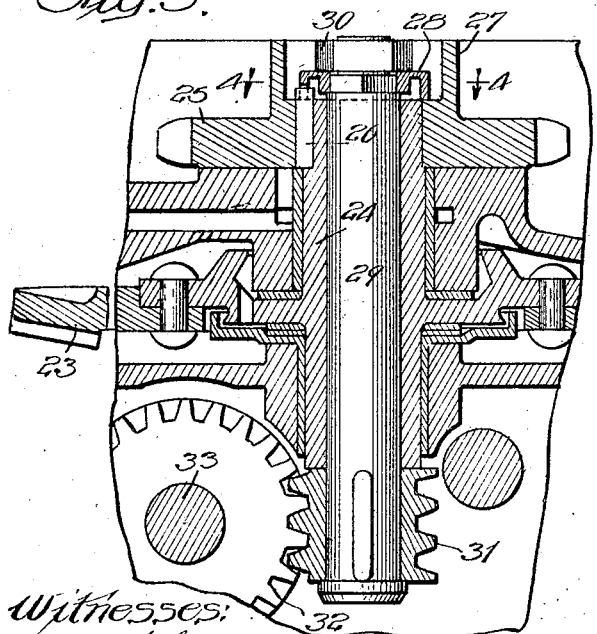
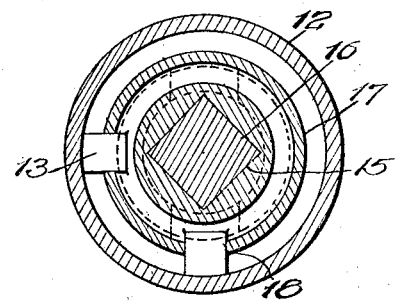
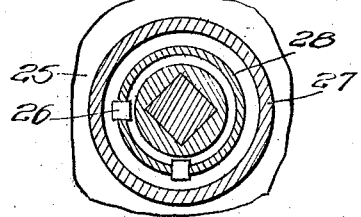
Inventor:  
Louis E. Mitchell  
By Glenn S. Noble, Atty.
Witnesses:  
W. F. Kilroy  
Harry R. L. White Patented Jan. 8, 1924.

1,479,922

UNITED STATES PATENT OFFICE.

LOUIS E. MITCHELL, OF CHICAGO, ILLINOIS, ASSIGNOR TO MORGAN GARDNER ELECTRIC CO., OF CHICAGO, ILLINOIS.

PROTECTING DEVICE FOR MACHINES.

Application filed October 6, 1921. Serial No. 505,951.

*To all whom it may concern:*

Be it known that I, LOUIS E. MITCHELL, a citizen of the United States, residing at Chicago, in the county of Cook and State of Illinios, have invented certain new and useful Improvements in Protecting Devices for Machines, of which the following is a specification.

This invention relates to devices which are more particularly adapted for use in connection with mining machines for preventing undue strains on the driving or propelling apparatus. Break washers have heretofore been used on such machines for taking the thrust or strains, such washers being adapted to break when subjected to undue pressure. These washers have usually been arranged so that when they break, the parts would be apt to fall down into the gearing or other moving parts of the machines and cause trouble. This is particularly true in electric machines as the broken pieces are apt to be attracted by the magnetized portions of the machine and injure the coils or other movable parts.

The objects of the present invention are to provide safety devices or protecting devices for mining machines or the like, having breakable members which are adapted to be fractured under undue strains; to provide means for retaining or collecting the broken pieces; to provide a combined driving and breaking element; to provide means for driving gearing from a shaft through the medium of a driving member, which is also subjected to compression, whereby it may be broken under undue strain; to provide a break washer with a housing for retaining the broken pieces; and, in general to provide such improvements as will be described more fully hereinafter.

In the accompanying drawings illustrating this invention;

Figure 1 is a front view of a worm and worm gear drive, provided with my improved driving and break washer, parts being broken away or shown in section;

Figure 2 is a sectional view taken on the line 2—2 of Figure 1.

Figure 3 is a sectional view of a modified form of drive; and,

Figure 4 is a sectional view taken on the line 4—4 of Figure 3.

As shown in these drawings, 5 represents a shaft which may be driven from any suitable source of power and which is provided with a worm 6 for engagement with a worm gear 7. The worm gear 7 is secured to a shaft 8 which may drive any suitable propelling or feeding mechanism for a mining machine or the like, such driving mechanism being in more or less common use.

The worm 6 is loosely mounted on the shaft 5 and is provided at its upper end with recesses 9 for receiving the jaws or projections 10 of a clutch member and cup 11 which is also loosely mounted on the shaft 5. The clutch member 11 has an upwardly extending flange or rim 12 forming a cup which surrounds the upper end of the shaft 5. The clutch member 11 has upwardly extending projections 13 for engagement with the combined driving and break washer 14. This washer comprises a disk portion having a hole 15 for receiving the correspondingly shaped driving portion 16 on the shaft 5, the hole and driving portion being preferably made square or of any suitable shape whereby the washer will be driven by the shaft. This washer also has a downwardly projecting flange 17 which rests against the upper end of the clutch member 11 and has slots or recesses 18 for receiving the projections 13.

The washer and other parts are held against longitudinal movement by means of a nut 19 which engages with the threaded end 20 of the shaft 5. This nut is preferably made with an outwardly extending flange 21 which fits closely within the cup 12 so as to retain the pieces when the washer 14 is broken. This nut has projections 22 for convenience in turning it on and off from the shaft.

The shaft 5 drives the clutch member 11 through the combined lock and washer 14, and the clutch member in turn drives the worm 6. The shaft 5 is turned so that the thrust of the worm under the driving strain is upwardly or against the washer 14. These washers are designed or constructed so that if the upward thrust or strain becomes excessive they will be broken and thereby relieve the driving strain on the machine. When one of the washers becomes broken, the operator removes the nut 19 and takes the broken pieces out of the cup 12. As all of these pieces are retained in the cup, they may be removed so that there is no possibility of the pieces falling down into the block or driving parts of the machine. A new washer is then inserted and the machine is again in condition for operation.

In the modified form of construction shown in Figures 3 and 4, the driving gear 23 is provided with a hub 24 upon which is keyed a sprocket 25 by means of keys 26, the hub of this sprocket is made in the form of a cup 27 which is similar to the cup 12. In this instance, the driving break washer 28 engages with the keys 26 and is driven thereby. This washer is mounted on a shaft 29 and is held against upward movement by a nut 30 on the end of the shaft. The lower end of the shaft 29 carries a worm 31 which is keyed to the shaft and driven thereby. This worm engages with a worm gear 32 which drives the feeding or propelling device of the mining machine. In this arrangement, the thrust of the worm 31 is downwardly so that if the strains become too great the washer 28 will be broken. In this instance, the parts of the broken washer are also retained in the cup so that they are not apt to injure the machine.

It will be particularly noted that in both arrangements of the device there are no driving parts in frictional engagement, therefore upon the breaking of the washer the strain will be positively relieved.

It will also be noted that the arrangement may be varied for different constructions, and therefore I do not wish to be limited to the exact form or arrangement herein shown and described except as specified in the following claims:

1. The combination with a shaft and gear mounted thereon, of means for driving the gear from the shaft, which includes a driving break washer adapted to be broken by the longitudinal pressure of the worm against said washer, said washer also being arranged to receive the entire torsional strain.

2. In a device of the character set forth, the combination of a shaft, a worm gearing, a driving break washer coacting with said shaft and the worm for driving the worm from the shaft, said washer having a flange for engagement with the worm, and the parts being arranged so that there is no frictional engagement between the driving members, whereby when the washer is broken all driving strain will be relieved although the gears remain in mesh.

3. A driving device comprising a shaft having an angular driving portion, a washer engaging with said portion and having a depending flange, a nut for holding the washer, a clutch member having projections engaging with recesses in said flange and a worm driven by said clutch member, said clutch member having an upwardly extending rim to form a cup for retaining the pieces when the washer is broken.

4. The combination with a shaft having a rectangular driving portion, of a washer engaging with said portion and having a depending flange, a nut for holding said washer against longitudinal movement, a worm loosely mounted on said shaft, and means for driving the worm from the washer whereby the washer will receive the torsional driving strains.

5. A break washer comprising a disk having a central opening for receiving a driving member and having a flange with recesses adapted to engage with a driven member.

6. The combination of a worm and worm shaft, a driving break washer associated with the shaft and adapted to receive the end thrust and means for retaining the pieces when the washer becomes broken.

7. The combination of a shaft, a worm loosely mounted on said shaft, a clutch member engaging with said worm for turning the same, a driving break washer secured to the shaft and engaging with said clutch member for turning the same and means for retaining the pieces when the washer becomes broken.

LOUIS E. MITCHELL.